US007003043B2

(12) United States Patent
Casper et al.

(10) Patent No.: US 7,003,043 B2
(45) Date of Patent: Feb. 21, 2006

(54) REPLICA DRIVER MISMATCH CORRECTION USING A VARIABLE OFFSET COMPARATOR

(75) Inventors: Bryan K. Casper, Hillsboro, OR (US); Stephen R. Mooney, Beaverton, OR (US); Aaron K. Martin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 798 days.

(21) Appl. No.: 10/044,087

(22) Filed: Jan. 9, 2002

(65) Prior Publication Data

US 2002/0097805 A1 Jul. 25, 2002

(51) Int. Cl.
*H04B 3/00* (2006.01)

(52) U.S. Cl. ............... 375/257; 375/130; 327/379; 327/387

(58) Field of Classification Search ............... 375/257, 375/130; 327/379; 330/9; 341/155
See application file for complete search history.

(56) References Cited

U.S. PATENT DOCUMENTS

| 4,754,169 | A | 6/1988 | Morris |
| 4,987,327 | A | 1/1991 | Fernandez et al. |
| 5,563,598 | A | 10/1996 | Hickling |
| 5,715,274 | A * | 2/1998 | Rostoker et al. ............ 375/130 |
| 6,348,882 | B1 | 2/2002 | Ciccone et al. |
| 6,388,521 | B1 | 5/2002 | Henry |
| 6,621,323 | B1 * | 9/2003 | Casper et al. ............... 327/379 |

OTHER PUBLICATIONS

William J. Dally & John W. Poultom, Digital Systems Engineering, Cambridge University Press, 1998, pp. 313-330 and 366-371.

* cited by examiner

*Primary Examiner*—Stephen Chin
*Assistant Examiner*—Jaison Joseph
(74) *Attorney, Agent, or Firm*—Blakely, Sokoloff, Taylor & Zafman LLP

(57) ABSTRACT

A number of data symbols are driven into a transmission line while simultaneously driving the data symbols into another node. A difference between a signal level from the transmission line and a signal level from the other node while driving the symbols is determined. The difference is applied to a signal input of a variable offset comparator. One of a number of binary values (offset codes) are applied to an offset control input of the comparator, to adjust an implied, variable reference level of the comparator, prior to the comparator performing a comparison between the input signal and the implied reference level.

21 Claims, 9 Drawing Sheets

REPLICA DRIVER MISMATCH CORRECTION USING A VARIABLE OFFSET COMPARATOR

The present patent application may be related to subject matter disclosed in one of the following commonly owned applications:

U.S. patent application Ser. No. 09/967,804, "Equalization of a Transmission Line Signal Using a Variable Offset Comparator", filed Sep. 28, 2001.

U.S. patent application Ser. No. 09/895,625, "Variable Offset Amplifier Circuit", filed Jun. 29, 2001.

U.S. patent application Ser. No. 09/968,349, "Multi-Level Receiver Circuit With Digital Output Using a Variable Offset Comparator", filed Sep. 28, 2001.

U.S. patent application Ser. No. 09/967,666, "Voltage Margin Testing of a Transmission Line Analog Signal Using a Variable Offset Comparator in a Data Receiver Circuit", filed Sep. 28, 2001.

U.S. patent application Ser. No. 09/960,821, "A Method and Apparatus for Outbound Wave Subtraction Using a Variable Offset Amplifier," filed Sep. 21, 2001.

BACKGROUND

This invention is in general related to simultaneous bidirectional data communication links, and in particular to techniques for subtracting an outbound wave from a transmission line signal and detecting simultaneously incoming data symbols.

I/O circuits act as the interface between different logic functional units of an electrical system. The functional units may be implemented in separate integrated circuit dies (i.e., IC chips) of the system. These chips may be in separate IC packages that have been soldered to a printed wiring board (i.e., PWB). The chips communicate with each other over one or more conductive transmission lines. The transmission lines may be a parallel bus formed on a PWB, and they may be of the point-to-point or multi-drop variety. Alternatively, the transmission line may be a serial link such as a coaxial cable. In both cases, each chip has an I/O circuit that includes a driver and a receiver for transmitting and detecting symbols. The driver and receiver translate between on-chip signaling and signaling that is suitable for high speed transmission (e.g., at several hundred megabits per second and higher) over a transmission line. In a 'bidirectional link', the driver and receiver pair are connected to the same transmission line.

In a simultaneous bidirectional (i.e., SBD) communication link, data symbols can be transmitted and received simultaneously over a single conductor of the transmission line, at each end of the communication link. Outgoing data symbols are encoded in an outbound wave that is transmitted by a driver over the transmission line, while incoming data symbols have been encoded in an inbound wave that is received over the transmission line. The transmission line signal, such as the voltage on the transmission line, is a superposition of the inbound and outbound waves. To detect a sequence of incoming data symbols, a copy of the outbound wave is subtracted from the transmission line signal to recover an estimate of the inbound wave. The incoming data symbols are then extracted or decoded from this estimated inbound wave in a subsequent comparison step, by repeatedly comparing the estimated inbound wave to one or more reference levels. These reference levels have been selected to discriminate between the different symbol levels. For example, to discriminate between two symbol levels which are ideally at 1.0 V and at 0.0 V, a reference level at 0.5 V may be used. This yields a margin of error of 0.5 V, which is the maximum allowed variation in the estimated inbound wave voltage (a variation greater than 0.5 V could yield an error in the detected symbol).

One of the difficulties in the SBD link described above is to how to generate an exact copy of the outbound wave, and then accurately subtract this from the transmission line signal. Part of the solution involves selecting the circuit that generates the copy of the outbound wave to be a replicate of the driver. This circuit is also referred to as a replica driver. The replica driver may, for example, include a 1:1 or scaled down structural duplicate of certain elements of the driver. However, in their manufactured versions, mismatch between corresponding circuit elements of the driver and its replicate is typically unavoidable. This mismatch renders a poorer or 'noisy' estimate of the inbound wave, which in turn reduces the margin of error allowed in the subsequent comparison step.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

FIG. 4 shows waveforms that illustrate how the noisy estimate can be corrected for.

DETAILED DESCRIPTION

A method and apparatus are described which can correct for noisy estimates of the inbound wave at the receiver portion of a bidirectional communication link. The noisy estimate may in part be a result of the aforementioned mismatch between the driver and its replicate. However, other types of noise in the estimate of the inbound wave can also be corrected by the method and apparatus, including for example mismatch in a subtraction circuit that is used to perform the outbound wave subtraction. A variable offset comparator (i.e., VOC) may be used to make the corrections. According to an embodiment, the VOC has a substantially variable, digitally controllable offset and can be implemented using a standard, digital complementary metal oxide semiconductor (i.e., CMOS) fabrication process, on the same integrated circuit chip as large scale integration logic. Such a VOC enables an easy calibration process to determine the binary correction values (also referred to as 'offset codes') that will be used to automatically configure the VOC to correct for the noise in the estimated inbound wave. Other inaccuracy inducing effects, such as device mismatch and offset within the VOC circuitry itself, can be easily cancelled by further adjusting the offset code.

Figure 1:
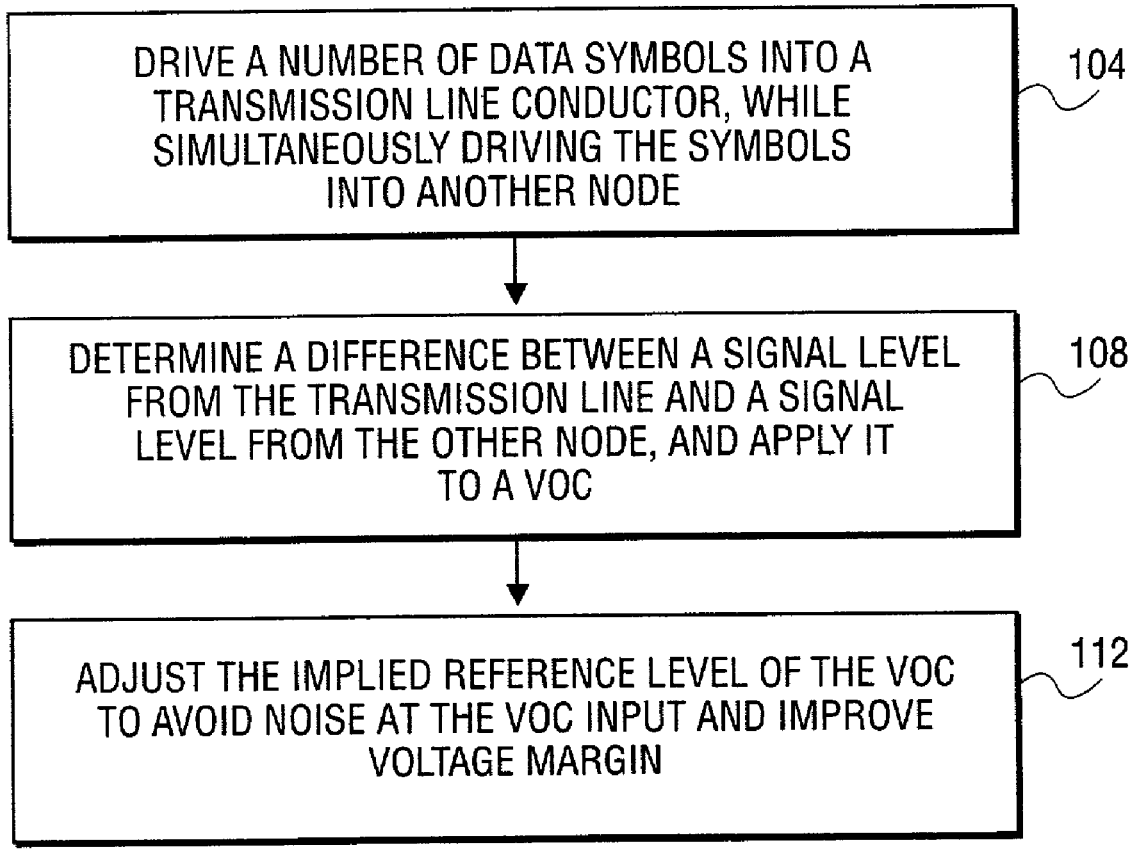
FIG. 1 shows a flow diagram of an embodiment of a method for correcting noisy estimates of an inbound wave.

An embodiment of a method for correcting the estimated inbound wave is illustrated in block diagram form in FIG. 1. A number of data symbols are driven into a conductor of a transmission line, while simultaneously driving the data symbols into another node (operation 104). The transmission line may feature one or more conductors, and may be a serial or parallel bus. Each data symbol may be binary (e.g., having a '0' or '1' value) or, as an alternative, a multi-level communication link may be used in which each symbol can take on more than two different symbol values. The encoding of the data symbols onto the transmission line signal can be performed using, for example, a pulse amplitude modulation (i.e. PAM) scheme. The transmission line signaling may be differential or single-ended, and it may use either voltage or current mode drivers.

While the data symbols are being driven in operation 104, a difference between a signal level from the transmission line and a signal level from the other node are determined (operation 108). This difference may be one of several measurements that together represent the subtraction of a copy of the outbound wave from the transmission line signal, to yield the estimated inbound wave. The difference can be obtained, for example, using a continuous time, analog subtraction circuit. According to an embodiment of the invention, this difference is then applied to a signal input of a VOC, such as the one described in the commonly owned U.S. patent application Ser. No. 09/895,625, filed on Jun. 29, 2001 and entitled "Variable Offset Amplifier Circuit " (P11200, pending). Various circuit implementations of the VOC will also be described below.

The VOC has substantially variable offset that is controllable to represent an implied, variable reference level. In other words, the VOC does not need a separate input to receive the reference level as a reference voltage. An output of the VOC provides a value, such as logic '0' or logic '1', that represents a comparison between a signal level at the VOC signal input and the implied, variable reference level. In the binary communication link embodiment, the output of the VOC may directly provide the sequence of detected, incoming data symbols that have been encoded in the inbound wave.

As explained above, the signal at the input of the VOC represents the estimated inbound wave but may be noisy. According to an embodiment of the invention, one of a number of binary values (offset codes) are applied to an offset control input of the VOC, to adjust the implied, variable reference level of the VOC (operation 112). The adjustment thus helps the VOC 'avoid' the noise more reliably, with greater voltage margin. In most cases, the noise will vary as a function of the outbound wave, and particularly the data symbol being driven. Therefore, the binary value that is applied to the offset control input of the VOC may need to be updated as a function of the data symbol being driven. Such an embodiment will be described below.

The VOC reference adjustment should be done prior to the VOC actually performing the comparison, according to a proper timing. The proper timing should be selected in view of the phase and frequency of the sequence of incoming data symbols being detected, as well as the shape of the noise that is present in the estimated inbound wave. An exemplary method for determining the timing as well as the offset codes that are to be applied to the VOC will also be given below.

Still referring to FIG. 1, the method may further include, in operation 108, sampling a signal from the transmission line and a signal from the other node, prior to determining the difference. This may help reduce jitter in the periodic detection of the incoming data symbols. Jitter is particularly undesirable in very high symbol rate communications where the adjacent symbols of a sequence are tightly spaced. A sample and hold circuit may be added to the continuous time subtractor referred to above, to achieve the sampling. An example of such a 'discrete time subtractor' is the discrete switched capacitor subtractor circuit described below.

According to an embodiment, the sampling of the transmission line is performed at the same frequency as that of the incoming data symbol rate and the outgoing data symbol rate. In such an embodiment, the binary value that is applied to the offset control input of the VOC may also be updated at that same rate. Finally, the clocking of the VOC, or alternatively the latching of its output, is also performed at the same rate. The relative phases of the sampling, data symbol transmit and receive, and offset code updating operations should be adjusted so that the incoming data symbols are correctly detected, with adequate timing margin, and with adequate voltage margin at the VOC.

Figure 2:
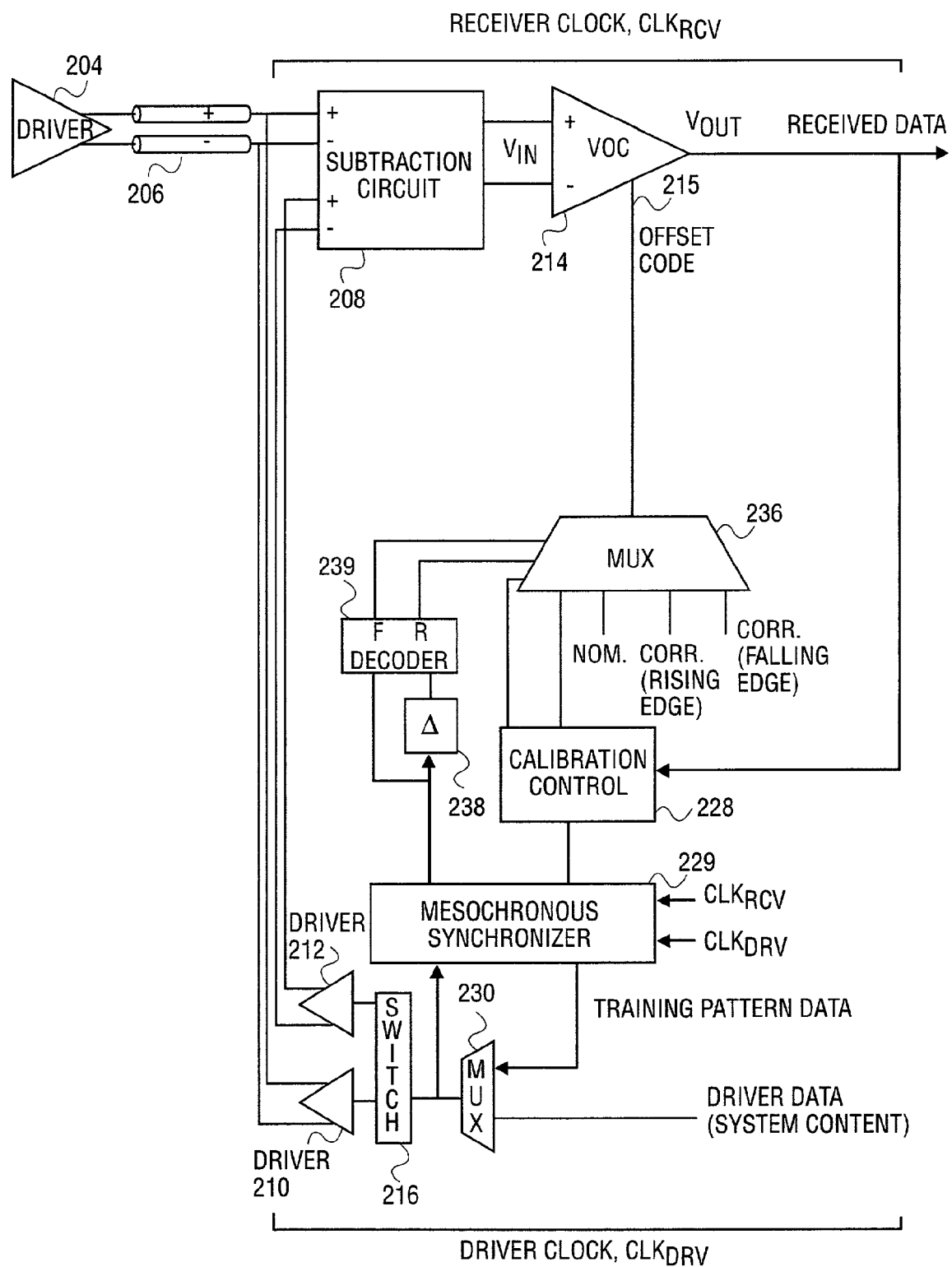
FIG. 2 depicts a block diagram of an embodiment of an apparatus for correcting noisy estimates of the inbound wave.

Turning now to FIG. 2, what is shown is a block diagram of a communication link that features an embodiment of an apparatus which can correct for noisy estimates of the inbound wave at the receiver portion. The receiver portion is at the near end of the communication link that features a transmission line 206. A far end driver 204 is coupled to the far end of the link. The receiver portion includes a first driver 210 having an output that is coupled to the transmission line 206. That combination may serve to transmit a number of near end data symbols while allowing simultaneous receipt of a number of far end data symbols. A second driver 212 being a replica of the first driver 210 has its output coupled to an input of a subtraction circuit 208. The latter combination may serve to emulate the transmission of the near end data symbols, without allowing receipt of the far end data symbols. The drivers 210, 212 may be of the voltage mode or current mode variety, and may be designed for differential signaling as shown (although single ended signaling can alternatively be used). The drivers may be formed on the same integrated circuit chip as the rest of the I/O circuitry shown in FIG. 2.

In certain embodiments, the inputs of the first and second drivers 210, 212 are coupled to simultaneously receive the same sequence of outgoing data symbols from the output of a multiplexer (i.e., MUX) 230. This is also referred to as a parallel connection. In other embodiments, however, the two drivers 210, 212 do not receive the same sequence simultaneously. This may be desirable for certain calibration procedures during which the VOC offset codes are determined. To enable such operating modes, a selector switch 216 with selectable low impedance paths may be provided, to control whether the sequence is to reach either or both of the inputs of the drivers 210, 212. The selector switch 216 may be controlled by a calibration control circuit 228 (to be further described below).

In the embodiment shown in FIG. 2, the transmission line signaling is differential rather than single ended, as evidenced by the dual signal paths in the transmission line 206. The subtraction circuit 208 may also have the capability to subtract two differential signals, for better accuracy. The output of the subtraction circuit 208 may yield the estimated inbound wave, either as a continuous time signal or as discrete time samples. The subtraction circuit 228 may serve to generate the difference between a signal level that represents one of the transmitted near end data symbols and a signal level that represents an emulation of that transmitted data symbol. In its discrete time version, the subtraction circuit 228 further includes a sampler circuit (not shown in FIG. 2), to capture and hold the signal levels at the inputs of the subtraction circuit 208. The output of subtraction circuit 208 may be coupled directly to the signal input of the VOC 214 as shown.

Figure 3:
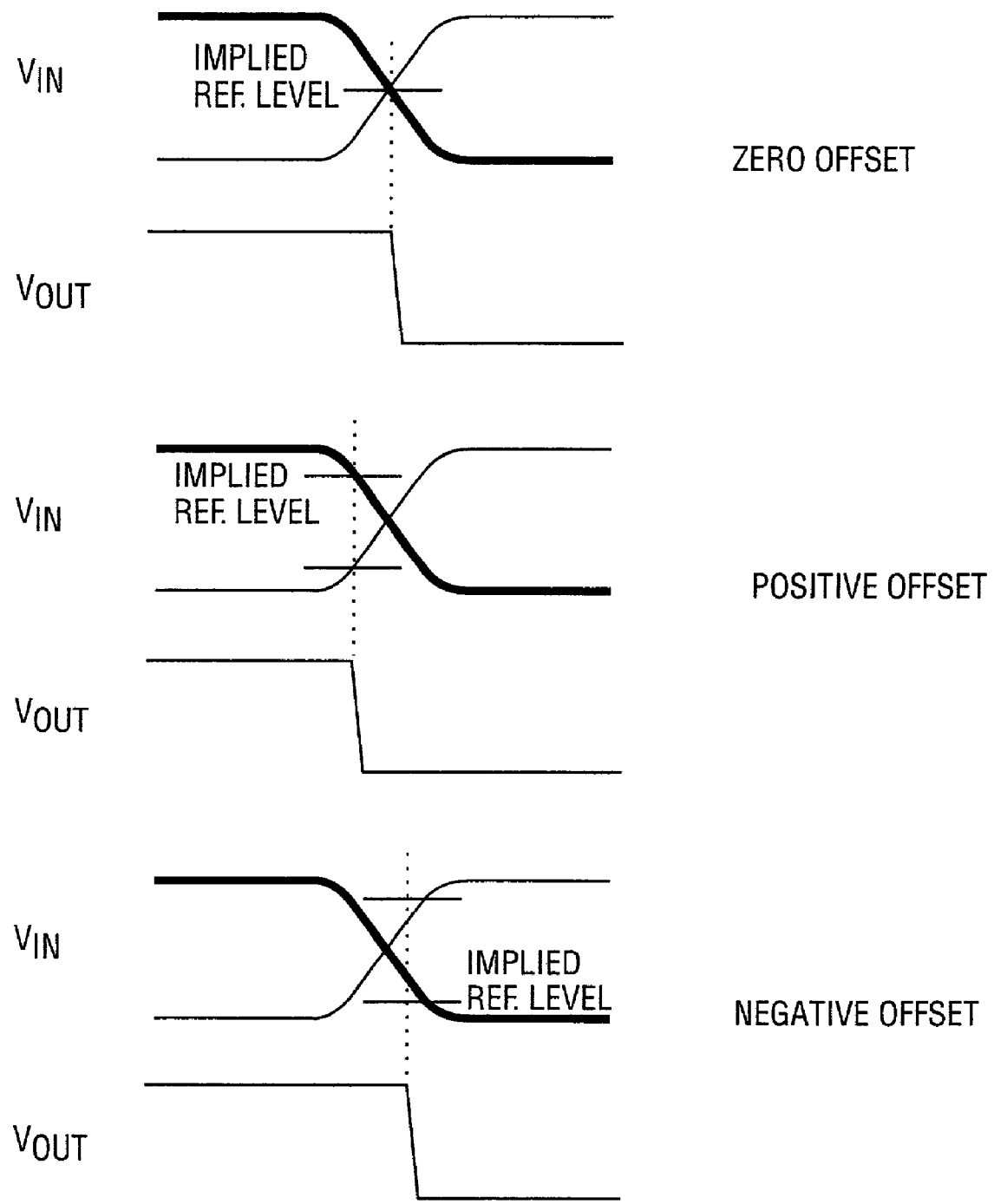
FIG. 3 illustrates the variable offset of a variable offset comparator using exemplary waveforms.

According to an embodiment, the VOC 214 has a differential signal input as shown to receive an analog signal $V_{in}$. A zero offset setting should result in the output of the VOC 214 changing state immediately after the differential input signal crosses zero volts. However, the offset of the VOC 214 is controllable as will described further below, via an offset control input 215. The offset control input 215 may be digital, namely designed to receive an offset code which is a binary value. Digital (as compared to analog) control of the variable offset provides a number of advantages, including greater flexibility in the calibration and adaptation of the VOC to operating conditions. The output of the VOC 214 in this embodiment is shown as a single ended, binary signal $V_{out}$, although a differential binary signal can alternatively be provided. The behavior of the VOC 214 when configured with zero offset is exemplified by the top waveform in FIG. 3. Note that when the offset is zero (or has been 'trimmed'), the output will transition at very close to the crossing point (zero differential voltage) of the input signal $V_{in}$. In contrast, when the offset is changed to, for example, a positive setting, the output will transition earlier than the input crossing point. This corresponds to the implied reference level having been raised, as can be seen in the middle waveform in FIG. 3. In an analogous fashion, when the offset is changed to a negative setting, the implied reference level is lowered, so that the output transitions later than the input crossing point.

The offset of the VOC 214 is substantially variable via the offset control input 215. According to an embodiment of the VOC 214, this means that if $V_{in}$ were a differential signal having maximum amplitude (as permitted by the input stage of the VOC 214), then the implied reference level can be moved in the positive and negative directions to cover a significant fraction of the maximum amplitude. In some applications of the VOC 214, however, it may be desirable to limit this variability of the offset about the zero offset setting, so as to take advantage of better common mode rejection capabilities of the VOC 214. For example, an offset in the range of +/−10 mV (about the zero offset setting) will remain substantially constant, over a wide range of input common mode voltage. However, an offset of +/−500 mV may not remain constant and will probably change substantially in response to a large change in the input common mode voltage.

Referring back to FIG. 2, the receiver portion of the communication link further includes a calibration control circuit 228. This circuit manages the calibration procedure (an example of which will be described below) that is performed to determine the VOC offset codes that will be used to make corrections to the estimated inbound wave. The circuit generates a training pattern which is a sequence of predetermined data symbols. The training pattern data is fed to an input of the MUX 230, while another input of the MUX 230 is coupled to receive valid data symbols that form system content. The calibration circuit 228 is coupled to control the MUX 230, to select either the training pattern or the system content. In addition, the control circuit 228 is coupled to control the selector switch 216, to determine whether one or both of the drivers 210, 212 is to receive the data symbols.

According to an embodiment, the received data provided by the VOC 214 is validated in a precisely timed sequence with period $T_{rcv}$, while the driver 110 transmits the data symbols according to a precisely timed sequence having period $T_{drv}$. These precise periods are provided by clock signals that may be referred to as the receiver and driver clock signals $CLK_{rcv}$ and $CLK_{drv}$, respectively. In general, it is desirable that the driver and receiver clock phases and frequencies track. For instance, it may be desirable to generate the near end receiver clock from the near end driver clock to help reduce the amount of jitter that may appear in the estimated inbound wave. In addition, assuming that the frequencies of the driver and receiver clocks are the same, a mesochronous synchronizer 229 may be used to align the phase of the training pattern data symbols to that of the driver clock $CLK_{drv}$ and align the phase of a copy of the system content to that of the receiver clock $CLK_{rcv}$ so that the offset codes that are fed to the VOC 214 are presented at the correct time intervals and with adequate timing margins in relation to the receiver clock. This may be achieved by positioning the synchronizer 229 as shown, between the input to the near end drivers 210, 212 and an output of calibration control circuit 228.

Although not explicitly shown, the techniques for applying the receiver and driver clock signals can be determined by those of ordinary skill in the art. For instance, the receiver clock signal may be used to enable a sampler within the subtraction circuit 208, or the VOC 214, or a subsequent latch stage that couples to the output of the VOC 214. Similarly, the driver clock signal may be introduced at the drivers 210, 212, or it may be introduced earlier (for example at the MUX 230 or in the synchronizer 229) to time the sequences of system content data and training pattern data.

In the embodiment of FIG. 2, a sampler may be incorporated into the subtraction circuit 208 between the VOC input and the transmission line 206. This sampler may be implemented using a sample and hold circuit whose output is to provide the transmission line analog signal level and the replica driver output signal level. The sampler may help reduce jitter in the estimated inbound wave. In such an embodiment, the sampler may be clocked by the receiver clock signal that may be phase and frequency locked to the driver clock signal. In another embodiment the sampler is not used and the estimated inbound wave is fed, as a continuous time signal, directly to the input of the VOC 214. In such a case, the VOC 214 or its latched output may be timed by the receiver clock to help reduce jitter.

In general, as suggested above, the driver data should be transmitted as synchronized to the driver clock signal, while the receive data should be detected according to the timing provided by the receiver clock signal, where the receiver and driver clocks are phase and frequency locked. The near end and far end receiver and driver circuitry may be of the source synchronous variety in which a clock or strobe signal is transmitted (not shown) in sync with the data, and the receiver clock is derived from the received clock or strobe.

However, other alternatives for obtaining the receiver and driver clock signals may be possible.

According to another embodiment, transmission line termination resistors (not shown) are coupled to the transmission line 206 in front of the subtraction circuit 208 (see FIG. 2). In yet another embodiment, electrostatic discharge protection circuitry (also not shown) is coupled to the transmission line 206 in front of the subtraction circuit. Other types of circuitry well known to those of ordinary skill in the art may be included in the near end circuitry.

Figure 4:
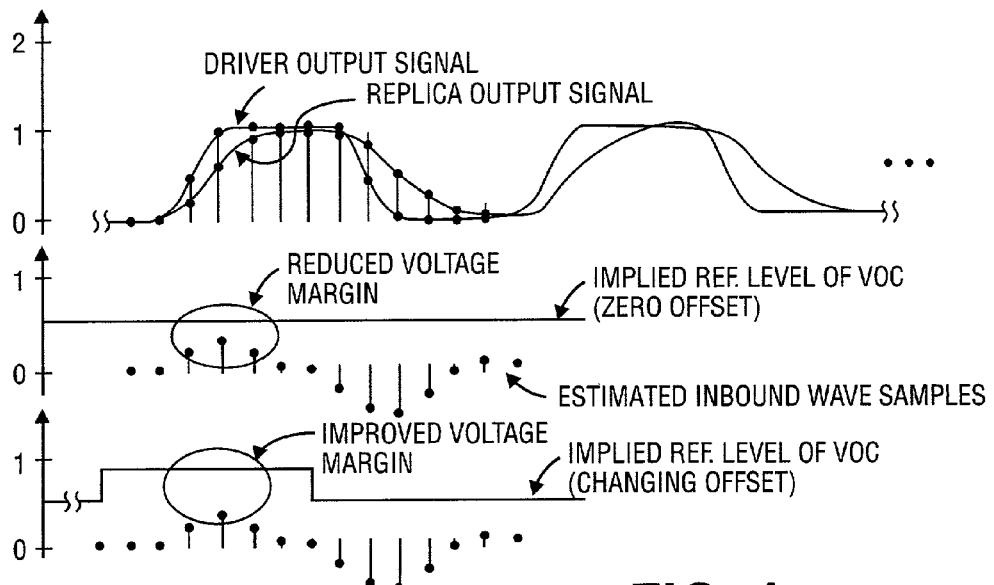

According to an embodiment of the invention, the application of the VOC 214 to make adjustments for noise in the estimated inbound wave may involve the exemplary waveforms shown in FIG. 4. In this example, the waveforms are obtained at the near end receiver while keeping the far end driver 'quiet' so that no symbols are transmitted by it. This is done merely to ease an explanation of various embodiments. In general, the VOC 214 can be used to make the adjustments in the estimated inbound wave even while the far end driver is transmitting any sequence of symbols, i.e. during a normal, simultaneous bidirectional communication session.

The waveforms in FIG. 4 illustrate a problem that may be caused by a failure to precisely duplicate the circuitry and behavior of the near end driver circuitry. This mismatch can result in a phase shift or other distortion between the driver output signal (which may be the same as the transmission line signal which is a superposition of the inbound and outbound waves) and the output signal of the replica driver (which is the copy of the outbound wave). The mismatch results in noisy, estimated inbound wave samples being provided to the VOC input by the subtraction circuit, as shown in the middle of the figure. Note how the noise in the estimated inbound wave samples reduces the voltage margin at the VOC, in relation to the implied reference level being at the midpoint between two adjacent symbol levels at 0.0 V and 1.0 V. Finally, the bottom of the figure shows how changing the offset of the VOC will increase the voltage margin during a transitioning of the driver output signal (see top waveform) between different data symbol levels.

Figure 5:
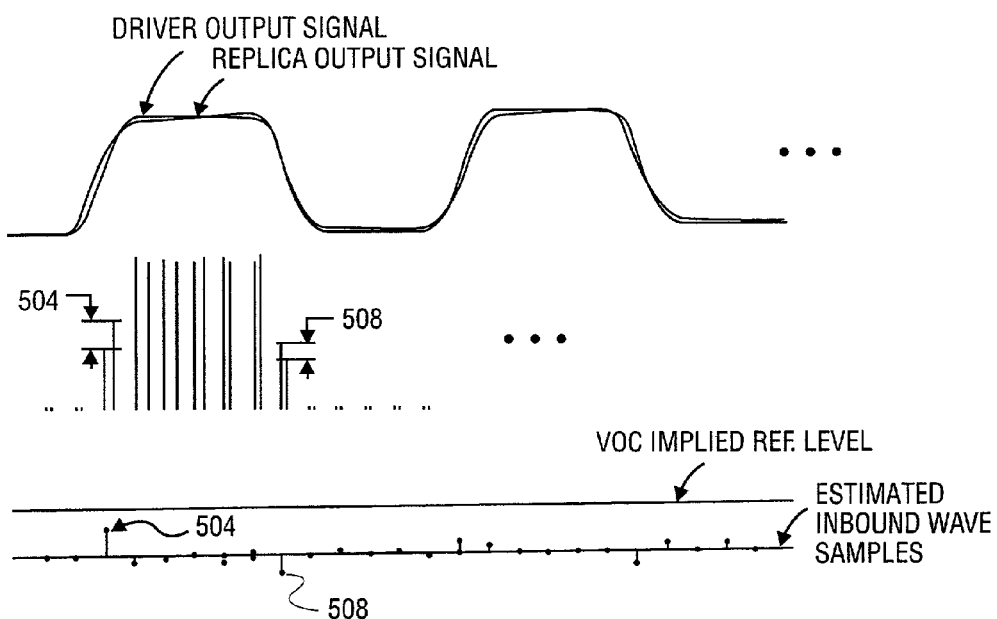
FIG. 5 depicts waveforms that explain an origin of the noisy estimated inbound wave.

Apart from the problem of mismatch between circuit elements of the near end driver and its replica, there may be a problem with mismatch within the subtraction circuit that feeds the VOC input. FIG. 5 demonstrates this problem. In this figure, the driver and replica output signals (as shown at the top of the figure) are substantially identical, yet the estimated inbound wave samples at the VOC input are still noisy (see bottom of the figure). This noise may be caused by time constant mismatch between the two channels of the sampler which is part of the subtraction circuit. This mismatch can yield errors 504, 508 that will be introduced into the two samples (see middle of figure) that are taken during the transitioning of the transmission line signal between different symbol levels. These errors 504, 508 may appear at the VOC input. If uncorrected, the error 504 will dramatically reduce the voltage margin in relation to the zero offset, implied reference level shown. Once again, changing the offset of the VOC to compensate for the error 504 will increase the voltage margin and thereby promote a more reliable detection of the incoming data symbols via the estimated inbound wave.

The offset codes that are applied to the VOC to compensate for noise in the estimated inbound wave may be determined by the following exemplary calibration procedure. First, a training pattern of data symbols are fed to both drivers 210, 212, while no pulses are transmitted by the far end driver (see FIG. 2). This results in a series of estimated inbound wave samples, such as the ones shown in FIGS. 4 and 5, being fed to the VOC input. Note that the offset code which configures the VOC to respond as if its reference level were 0.5 Volts (which is the nominal or 'design' reference level for binary signaling in which the symbol levels are at 0.0 V and 1.0 V) has been previously determined. See for example U.S. patent application Ser. No. 09/968,349, "Multi-Level Receiver Circuit With Digital Output Using a Variable Offset Comparator", for techniques on how to determine these offset codes.

The offset code that represents the maximum amplitude of the noise is then determined by, for example, stepping the VOC offset downwards from its nominal level and allowing a few data symbols to be transmitted at each step. The VOC offset is stepped downwards until its output changes state. The difference between the offset code at this point and the offset code corresponding to the nominal, reference level represents the amplitude of the noise. This noise amplitude may then be the exact adjustment that will be made to the implied reference level, an amount approximately equal to the difference between the signal level that represents a transmitted near end data symbol and a signal level that represents the emulation of that symbol.

In the procedure above, the problem noise was a positive pulse in the estimated inbound wave samples. This type of pulse reduced the voltage margin relative to a nominal reference level that was more positive. A similar procedure may be performed for situations in which the problem noise is a negative (or downwardly directed) pulse. In the latter case, the VOC offset would be stepped upwards from its nominal or design setting, until its output changes state. Other procedures for representing the amplitude of the noise, in the estimated inbound wave, by its corresponding offset code may alternatively be used.

Once the offset codes that correspond to the amplitudes of the noise pulses have been determined, a number of correction offset codes are determined. The correction offset codes will shift the implied reference level of the VOC so that adequate voltage margin is achieved in view of the noisy estimated inbound wave. The correction offset codes should be determined in view of the amplitude of the noise, the nominal reference level, and the desired voltage margin. For example, a correction code may be the sum of the offset codes that correspond to a nominal reference level and a positive noise pulse amplitude. Another correction code may be the difference between the offset codes that correspond to a nominal reference level and a negative noise pulse amplitude. Additional increases or decreases may be made to such correction codes, in view of the desired voltage margin.

The exemplary correction offset codes described above could be applied to the VOC 214 using the control circuit shown in the embodiment of FIG. 2. These correction codes are labeled as the rising and falling edge corrections, at two of the inputs to the MUX 236. Another input to the MUX 236 receives the offset code corresponding to the nominal reference level which may be approximately the midpoint between two adjacent, nominal data symbol levels defined for a transmission line signal in the communication link. Yet another input to the MUX 236 receives an offset code that can be varied by the calibration control circuit 228. This latter input is used for the calibration procedure described above. Additional correction codes may be provided via the MUX 236, to adjust the implied reference level of the VOC 214 and thereby correct for noise that may have been caused by, for example, mismatch between the transmission and emulation circuitry and mismatch in the subtraction circuit 228. The control circuit determines which correction code to apply at the proper timing, via the MUX 236, to change the implied reference level of the VOC 214.

For the exemplary situation depicted in FIG. 4, it can be seen that the correction should be applied to change the VOC offset before a transitioning of the transmission line output signal (or driver output signal) from low to high. Still referring to FIG. 2, a timing circuit which may include, for example, the delay element 238 and decoder 239, can be used to detect a falling edge in the transmission line signal, and in response select the rising edge correction through the MUX 236, in time for the subsequent low to high transition. The output of the decoder 239 generates a pulse at the 'r' output in response to detecting a rising edge, and another at the 'f' output in response to detecting a falling edge. These pulses are then effectively mapped to the implied reference level as shown in FIG. 4, through the action of the MUX 236 and VOC 214.

Figure 7:
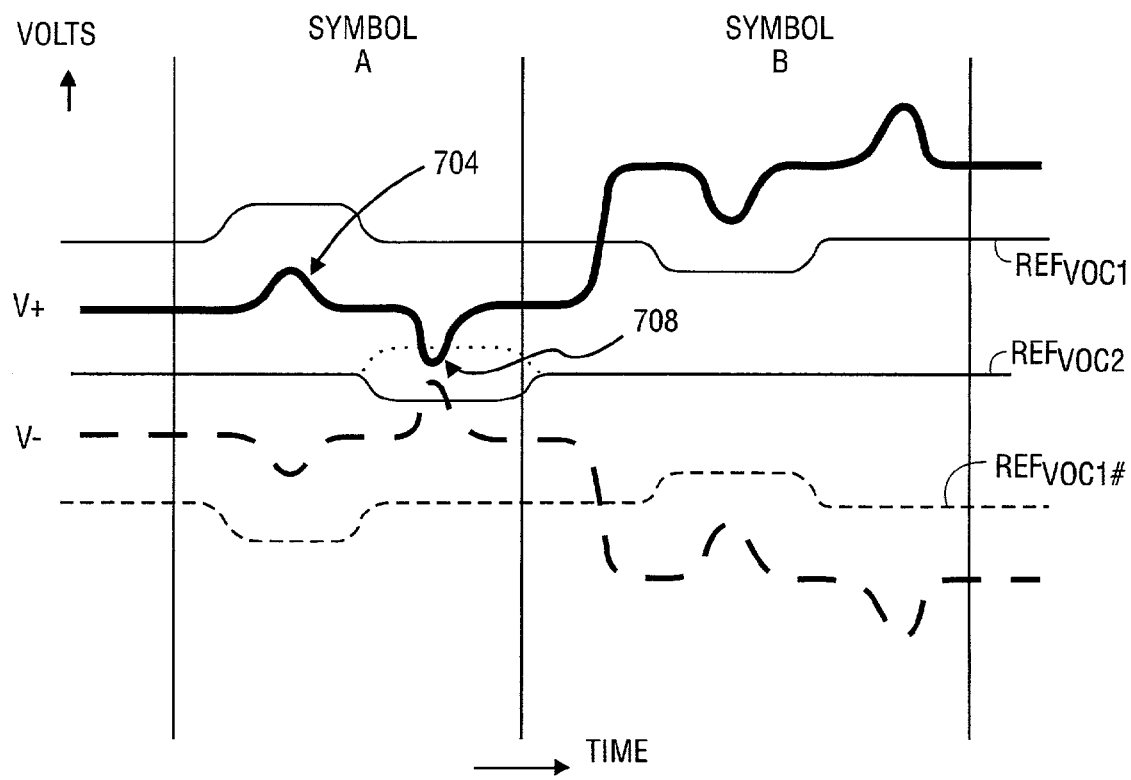
FIG. 7 shows waveforms that explain how the noisy estimate can be corrected for in a differential signaling embodiment.
Figure 6:
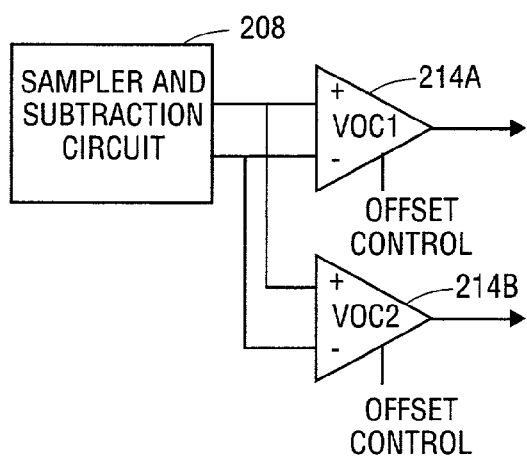
FIG. 6 illustrates a circuit diagram of multi-level receiver circuitry.

In the example of FIG. 4, the implied reference level is moved upwards to increase the voltage margin in the presence of a positive noise pulse. In that example, note that the ensuing negative noise pulse does not reduce the voltage margin for the VOC, because the noise pulse is directed downwards, away from the nominal reference level. In certain applications however, such as multi-level receivers, the negative noise pulse is a problem. FIG. 6 shows part of a multi-level receiver in which VOCs 214a and 214b are coupled to receive the same estimated inbound wave from the subtraction circuit 208. The reference levels of the VOCs 214a, 214b are shown in FIG. 7. Note the shape of the VOC input signal waveform (the estimated inbound wave in this embodiment) given by the differential input signal $V_+ - V_-$. The dotted lines in FIG. 7 are used to indicate the complementary signals of the VOC 214 as it operates on the differential input signal. The multi-level signaling here allows four different symbols (as opposed to just two with binary signaling). Two symbols, A and B, are shown in the figure. The first one suffers from a positive noise pulse 704 and a negative noise pulse 708. The positive pulse 704 reduces the voltage margin at the VOC 214a, whereas the negative pulse 708 reduces the voltage margin at the VOC 214b. Accordingly, the reference level of the VOC 214b, rather than VOC 214a, is lowered during the negative pulse 708. Also, note how the complementary reference level, shown in dotted lines, is increased in a corresponding amount. This shows that the reference levels of multiple VOCs in the receiver portion may need to be moved upwards and downwards, depending upon the maximum amplitude and timing of noise pulses expected in the estimated inbound wave.

If the receiver voltage margin as measured during the filter calibration process were to remain the same thereafter, during normal operation of the receiver, then the offset codes for controlling the VOC offset once calibrated would remain optimal. However, the voltage margin may change during normal operation due to environmental factors such as increased attenuation in the transmission line as well as due to other factors. To keep the voltage margin uniform under such circumstances, the offset codes may be adapted to maintain this uniformity by, for instance, periodically detecting the voltage margin and in response, using for example a least means square algorithm, adjusting the offset codes to maintain the uniform voltage margin.

Figure 8:
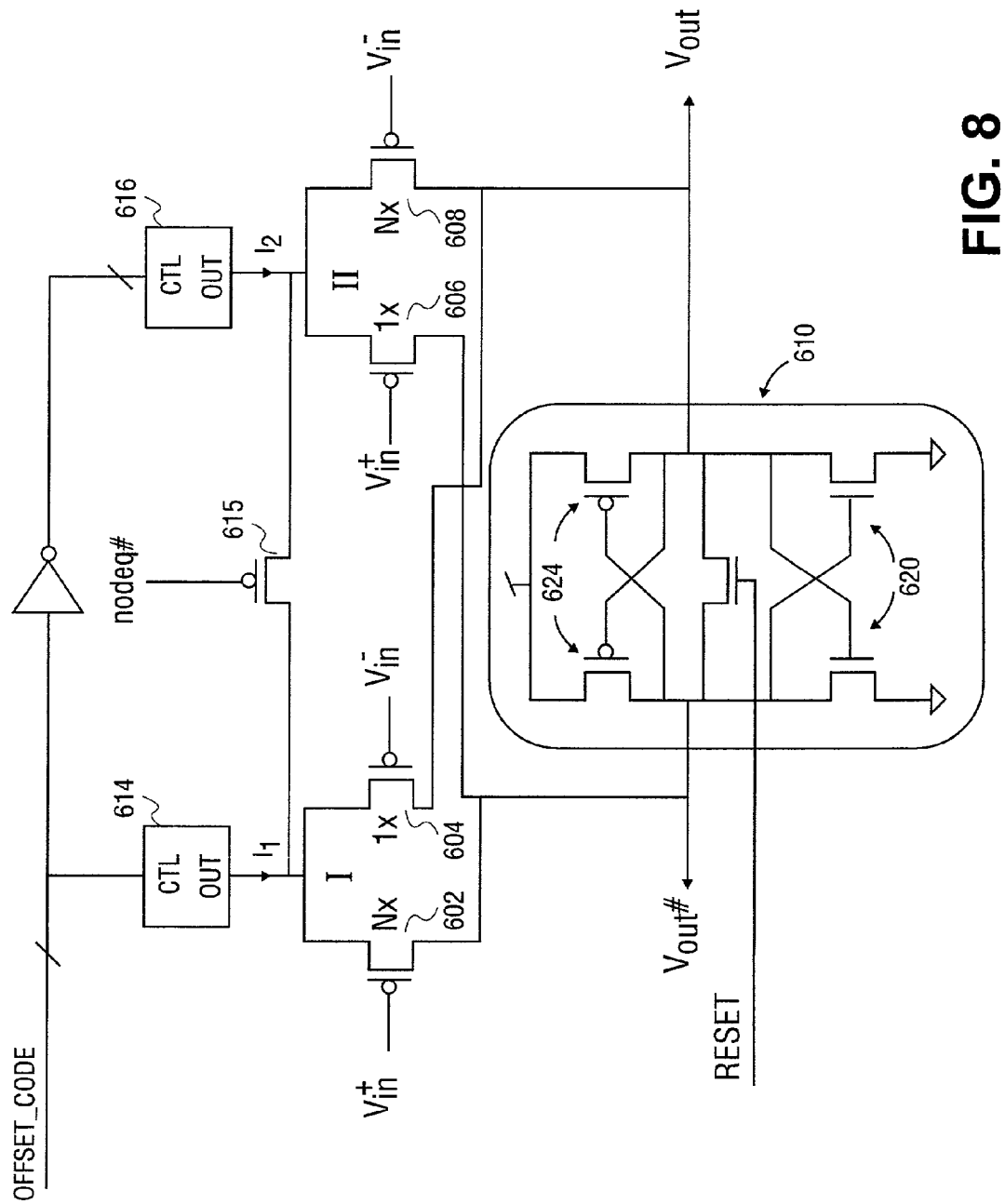
FIG. 8 depicts a circuit diagram of an embodiment of a variable offset comparator.

Turning now to FIG. 8, this figure depicts a circuit schematic of an embodiment of the VOC 214. The comparator circuit includes an amplifier circuit including first and second differential pairs I and II which are defined by transistors 602, 604 and 606, 608, respectively. Variable current generators 614 and 616 are also coupled to control the tail currents $I_1$ and $I_2$ to the respective differential pairs. These current generators 614, 616 are controlled by a digital value known as the 'offset code' that is received on multiple, offset select lines as shown. In this embodiment, each digital value of the offset corresponds to two oppositely varying tail currents $I_1$ and $I_2$ that are equidistant from a nominal tail current.

A single ended output voltage for this comparator may be available as either $V_{out}$ or $V_{out}\#$. To drive these output signals into one of two possible stable states, a regenerative load circuit 610 is provided as shown. After the output nodes have been equalized and then released by a reset pulse signal, this regenerative load circuit 610 will quickly amplify any initial difference between $V_{out}$ and $V_{out}\#$ that has been caused by the inputs $V_{in}^+$ and $V_{in}^-$, where such amplification occurs at a relatively high gain due to the cross coupled n-channel pair 620 and p-channel pair 624, thereby ensuring that the output signals $V_{out}$ and $V_{out}\#$ only assume one of two possible stable states. Thus, if $V_{in}^+$ is greater than $V_{in}^-$ by at least the amount of offset that has been selected (as referred back to the input of the differential pairs), then the regenerative latch circuit 610 forcefully drives $V_{out}$ to a high voltage level and simultaneously drives $V_{out}\#$ to a low voltage level. Other types of regenerative latch circuits may be used to provide the digital type output signal typically associated with a sense amplifier or a comparator application.

Figure 9:
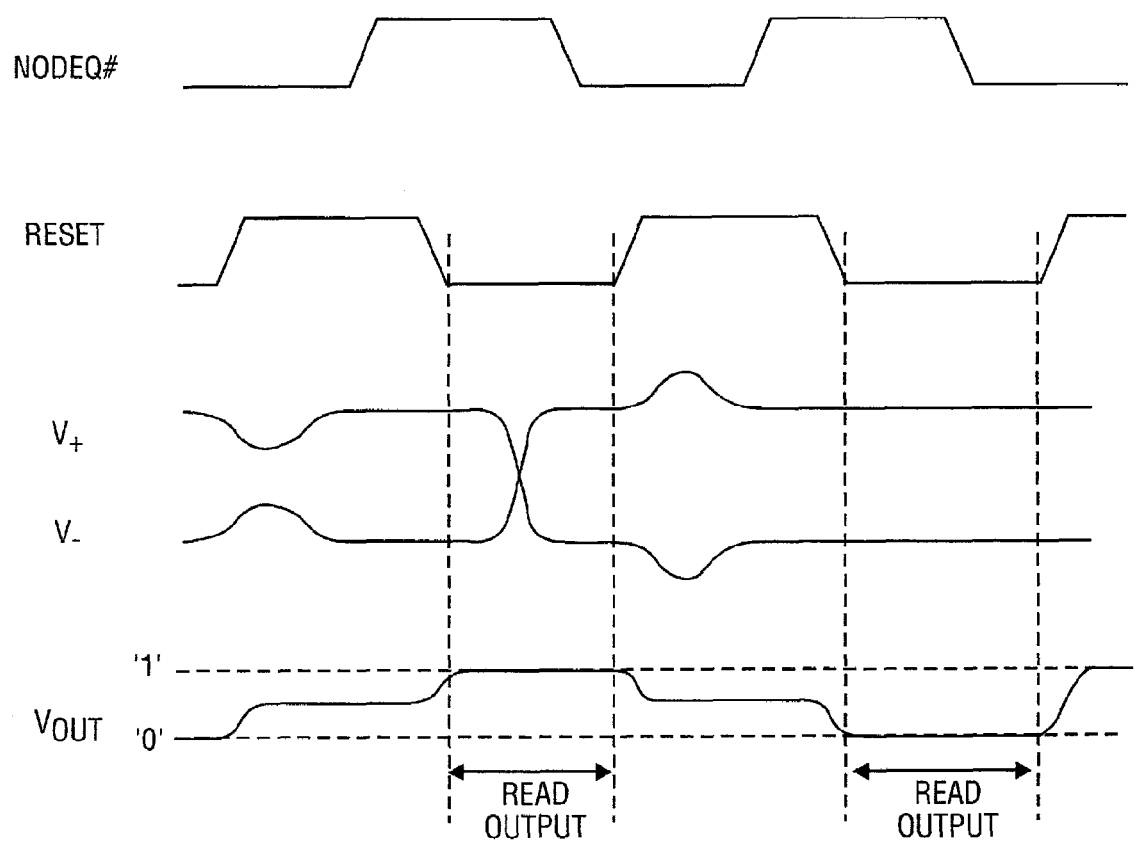
FIG. 9 illustrates waveforms that explain how the comparator operates.

Still referring to FIG. 8, the VOC 214 may be configured with a p-channel switching FET 615 that is coupled between the tail current nodes of the differential pairs I and II. Other types of switching transistors may alternatively be used, although the p-channel FET may be particularly effective for the illustrated embodiment in which differential pairs I and II are made of p-channel FETs. The switching FET 615 may be controlled by a clock signal nodeq# which, when asserted, equalizes the voltage of the tail current nodes. By equalizing the tail current nodes, transients in $V_{in}^+$ and $V_{in}^-$ are expected to dissipate more quickly, thereby potentially improving the sensitivity and speed of operation of the VOC 214 under certain conditions. This capability may be particularly desirable when the inherent offset in the VOC 214 has been trimmed to zero, and the signal input to the VOC 214 is likely to exhibit a large transient prior to settling. The presence of the large transient, at the signal input of a zero offset trimmed VOC, immediately before the comparison occurs by the VOC 214 degrades its sensitivity and increases its effective input offset. This occurs perhaps because the transient on the intentionally unbalanced differential pairs I and II injects differential noise between the tail current nodes. Without node equalization, this injected noise could cause the tail currents to change significantly, due to the finite output impedance of the variable current generators 614, 616. Although eventually the tail current nodes would settle back to their quiescent voltages (that were set by the offset trimming process mentioned above), this may take a significant period of time relative to the period of a comparison cycle of the VOC 214. Thus, to help hasten the recovery, tail current equalization via the switching FET 615 may be provided. FIG. 9 shows a timing diagram of an exemplary sequence of comparison cycles using the VOC 214 with tail current node equalization.

In the exemplary timing diagram of FIG. 9, two comparison/read cycles are depicted. The signal input of the VOC 214 is depicted by the waveforms for $V^+$ and $V^-$ in which some transients can be seen. The reset signal is a 50% duty cycle square wave that determines when the output voltage of the VOC 214 can be read. The nodeq# signal is, in this example, a delayed version of the reset signal. The relative phase between the nodeq# signal and a clocking signal that enables the output of the subtraction circuit (see FIG. 10 described below) is selected to ensure that the transients in $V^+$ and $V^-$ have dissipated by the time nodeq# rises, before the VOC 214 output is enabled by the reset signal being deasserted. The output voltage of the VOC 214 may be read in the intervals indicated.

Figure 10:
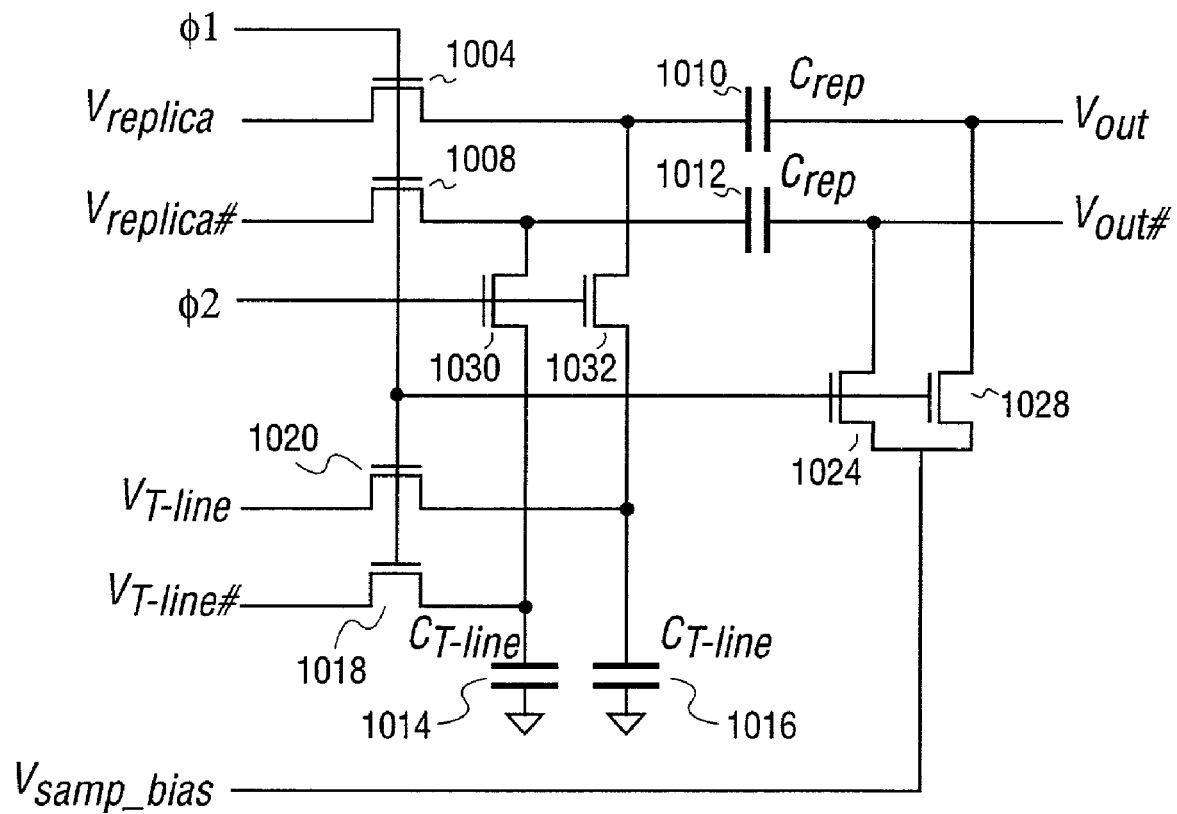
FIG. 10 shows a circuit schematic of an exemplary subtraction circuit.

The embodiments of the mismatch correction apparatus described above use a subtraction circuit 208 (see FIG. 2) to obtain the estimated inbound wave. An exemplary circuit schematic of the subtraction circuit 208 having a sampler is illustrated in FIG. 10. This particular subtraction circuit features a switched capacitor sampler having differential inputs to receive input voltage $V_{replica}$, $V_{replica\#}$ from the output of the replica driver 212 and input voltage $V_{Tline}$, $V_{Tline\#}$ from the transmission line 206 (see FIG. 2). The replica driver signal is fed to a pair of sampling capacitors 1010, 1012 of capacitance $C_{rep}$ via respective n-channel switching FETs 1004, 1008 that are controlled by a clock signal $phi_1$. Similarly, the transmission line signal is fed to a pair of sampling capacitors 1014, 1016 of capacitance $C_{Tline}$ via respective n-channel switching FETs 1018, 1020 that are also controlled by the clock signal $phi_1$. One plate of the sampling capacitors thus receives the input voltage while the other plate is biased to some suitable reference voltage. The reference voltage is selected to scale and/or level shift the desired output voltage $V_{out}$, $V_{out\#}$ which may not necessarily be exactly equal to the difference between the input voltages. In this instance, the reference voltages are ground (zero Volts) for the capacitors 1014, 1016 and a somewhat arbitrary $V_{Samp-bias}$ for the capacitors 1010, 1012. Note that in the exemplary schematic of FIG. 10, the bias voltage $V_{Samp-bias}$ is removed from the plates of capacitors 1010, 1012 prior to generating the difference voltage $V_{out}$, $V_{out\#}$ at those same plates. This may be accomplished by a pair of switching FETs 1024, 1028 that are also controlled by the clock signal $phi_1$. After the channels have been sampled, the subtraction may be completed by a pair of switching FETs 1030, 1032 which create low impedance paths between respective capacitors 1014, 1016 and 1010, 1012 in response to a $phi_2$ clock signal. An exemplary operation of the subtraction circuit in FIG. 10 is now described.

Let the clock signal $phi_1$ be a 50% duty cycle square wave that has been generated using a rising edge delay circuit. The clock signal $phi_2$ may be produced by delaying $phi_1$ with, for example, a single logic inverter. A sequence of sampling and subtraction could be as follows:

1. The $phi_1$ clock signal falls and in response
  (a) the transmission line voltages are sampled and held by $C_{Tline}$ and
  (b) the replica driver voltages are sampled and held by $C_{replica}$.
2. Then, the $phi_2$ clock signal rises one inversion delay after $phi_1$, falls and in response
  (a) the capacitors $C_{Tline}$ and $C_{replica}$ are connected to each other in series which results in
  (b) the differential output voltage $V_{out}$, $V_{out}\#$ being proportional to the transmission line voltage minus the replica driver voltage.

To reduce the magnitude of errors and attenuation in the output voltage $V_{out}$, $V_{out\#}$ for practical implementations of the subtraction circuit shown in FIG. 10, parasitic capacitance to power supply and return nodes (such as switch diffusion capacitance, amplifier gate capacitance, etc.) should be kept small. To reduce the asymmetry of the errors, it may help to match all of the parasitic capacitance between differential lines. To reduce parasitic capacitance overall, the size of the n-channel switching FETs may be reduced. Increasing the capacitance of the sampling capacitors may reduce attenuation. However, these methods may limit the bandwidth of the sampling. A better way to reduce attenuation may be to reduce the size of the input stage transistors 602, 604, 606, and 608 of the VOC 214 which is to receive the output voltage (see FIG. 8). As mentioned above, the VOC 214 may be used to help cancel any errors introduced by the subtraction circuit, by virtue of its adjustable offset. Circuit designs other than the one shown in FIG. 8 may of course be alternatively used.

Figure 11:
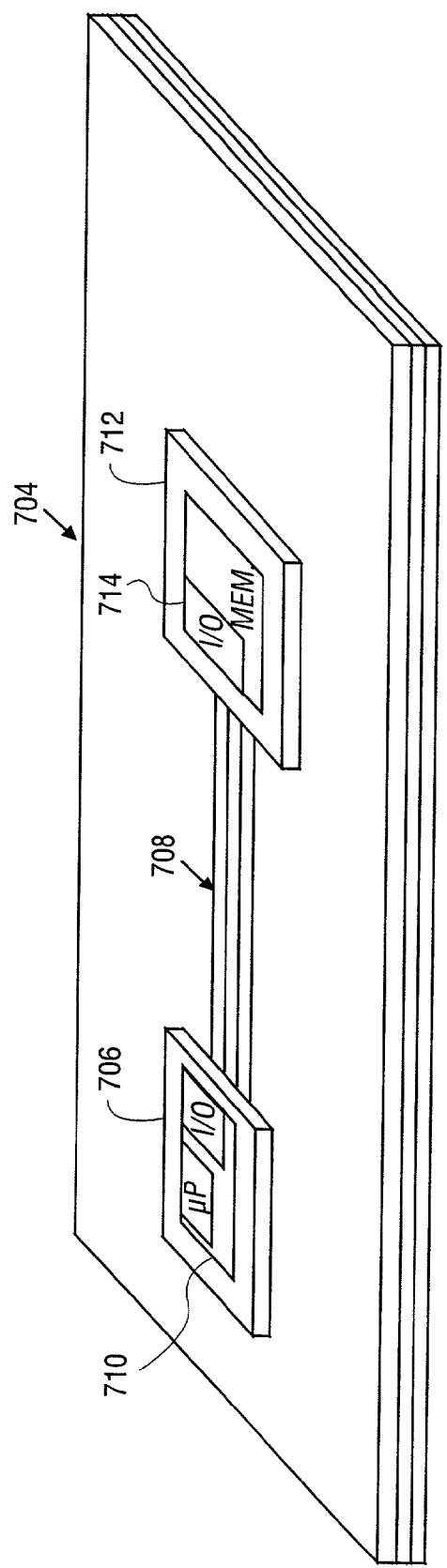
FIG. 11 depicts a block diagram of an embodiment of an electronic system featuring the noisy estimated inbound wave correction technique.

Turning now to FIG. 11, what is shown is a block diagram of an embodiment of an electronic system in which a communication link features the apparatus described above for correcting the noisy, estimated inbound wave. The system has a multi-layer printed wiring board 704 on which a parallel bus 708 is formed. The bus 708 may be of the point to point variety, or a multi-drop bus such as those used in a main memory. An integrated circuit (IC) chip package 706 is operatively installed on the board to communicate using the parallel bus 708. The installation of the package 706 may be done by a surface mount technique or via a connector or socket. The package has an IC chip 710 that includes a logic function section, and an I/O section as an interface between the logic function section and the bus 708. The logic function suction may be one of the following well-known devices: a microprocessor, a memory controller, and a bus bridge. Alternatively, other devices that can be implemented in the logic function section of an IC chip may be used. The I/O section has a bus receiver in which an apparatus described above for correcting the noisy, estimated inbound wave is provided.

A second IC package 712 is also installed on the board 704 to communicate with the first package 706 via the bus 708. The second IC package 712 also includes a chip 714 having an I/O section in which a bus receiver is provided to interface the bus 708, and its own logic function section (here shown as a memory controller).

According to an embodiment, the I/O interfaces of the two chips 710 and 714 communicate with each other bi-directionally, that is using the same conductive lines of the bus for both transmitting and receiving data. Thus, in such an embodiment, drivers are provided, in both IC chips, that are connected to the same conductive lines of the bus 708. Other system applications of the apparatus described above for correcting the noisy, estimated inbound wave are possible, including, for example, a cable receiver.

To summarize, various embodiments of a method and apparatus for correcting for a noisy, estimated inbound wave in a simultaneous bidirectional link have been described. In the foregoing specification, the invention has been described with reference to specific exemplary embodiments thereof. It will, however, be evident that various modifications and changes may be made thereto without departing from the broader spirit and scope of the invention as set forth in the appended claims. For instance, although the embodiments above were described using an example in which the far end driver was quiet while the near end driver was transmitting pulses, the estimated inbound wave correction technique can also be applied to a wide range of simultaneous near end and far end transmissions, assuming that the transmission line can be modeled as a linear time invariant system. The specification and drawings are, accordingly, to be regarded in an illustrative rather than a restrictive sense.

What is claimed is:

1. A method comprising:
   (a) driving a plurality of data symbols into a transmission line while simultaneously driving the plurality of data symbols into another node;
   (b) determining a difference between a signal level from the transmission line and a signal level from the other node while performing (a), and applying the difference to a signal input of a comparator, the comparator having a substantially variable offset that is controllable to represent a variable reference level, an output of the comparator to provide a value that represents a comparison between a signal level at the comparator input and the variable reference level; and
   (c) applying one of a plurality of binary values to an offset control input of the comparator, to adjust the variable reference level prior to the comparator performing the comparison.

2. The method of claim 1 further comprising:
   sampling a signal from the transmission line and a signal from the other node while performing (a), prior to determining the difference.

3. The method of claim 1 further comprising:
   updating the binary value that is applied to the offset control input of the comparator as a function of the data symbol being driven.

4. The method of claim 1 further comprising:
   clocking the comparator at the same frequency as sampling the signal from the transmission line, updating the binary value, and driving the plurality of data symbols.

5. A circuit comprising:
   a first driver having an output to be coupled to a transmission line;
   a second driver being a replica of the first driver, the first and second drivers having inputs being coupled to receive the same sequence of outgoing data symbols;
   a subtraction circuit having a first input to be coupled to the transmission line and a second input coupled to the output of the second driver;
   a comparator having an input coupled to an output of the subtraction circuit, the comparator having a substantially variable offset that is controllable to represent a variable reference level, an output of the comparator to provide a value that represents a comparison between a signal level at the comparator input and the variable reference level; and
   a control circuit having an output that is coupled to an offset control input of the comparator and is to provide a first binary value that corrects for one of a mismatch between the first and second drivers and a mismatch in the subtraction circuit.

6. The circuit of claim 5 wherein the control circuit further comprises a multiplexer having an output being coupled to the offset control input and a first input coupled to receive the first binary value, and a timing circuit coupled to control the multiplexer so that the variable reference level of the comparator is adjusted, according to the first binary value, prior to a transitioning of a transmission line signal between different data symbol levels.

7. The circuit of claim 6 wherein the multiplexer further includes a second input coupled to receive a second binary value which represents the variable reference level being approximately at the midpoint between two adjacent, nominal data symbol levels defined for the transmission line signal.

8. The circuit of claim 7 wherein the first binary value represents a difference between the transmission line signal and the second driver output signal during the transitioning of the transmission line signal between the different data symbol levels.

9. The circuit of claim 8 wherein the comparator input is differential.

10. The circuit of claim 9 wherein the comparator has a differential input provided by first and second differential pairs each pair having first and second output nodes, the first output node of the first pair being coupled to the second output node of the second pair, the second output node of the first pair being coupled to the first output node of the second pair, and first and second variable current generators coupled to control respective tail currents of the first and second differential pairs.

11. The circuit of claim 9 wherein the subtraction circuit further includes a sampler circuit coupled to sample signals at the first and second inputs.

12. A system comprising:
   a printed wiring board on which a bus is formed, an integrated circuit (IC) chip package installed on the board to communicate using the bus, the package having an IC chip that includes a logic function section and an I/O section as an interface between the logic function section and the bus, the I/O section having a first driver whose output is coupled to the bus, a second driver being a replica of the first driver, the first and second drivers having inputs being coupled to receive the same sequence of outgoing data symbols, a subtraction circuit having a first input coupled to the bus and a second input coupled to an output of the second driver, a comparator having an input coupled to an output of the subtraction circuit, the comparator having a substantially variable offset that is controllable to represent a variable reference level, an output of the comparator to provide a value that represents a comparison between a signal level at the comparator input and the variable reference level, and a control circuit having an output that is coupled to an offset control input of the comparator and is to provide a binary value.

13. The system of claim 12 wherein the logic function section is a microprocessor.

14. The system of claim 12 wherein the logic function section is a memory controller.

15. The system of claim 12 wherein the logic function section is a bus bridge.

16. The system of claim 12 wherein the binary value represents a first adjustment to the variable reference level of the comparator, and the control circuit further includes a timing circuit coupled so that the variable reference level of the comparator is adjusted, according to the binary value, prior to a transitioning of a signal on the bus between different data symbol levels.

17. A circuit comprising:
   means for transmitting a plurality of near end data symbols while allowing the simultaneous receipt of a plurality of far end data symbols;
   means for emulating the transmission of the plurality of near end data symbols;
   means for generating a difference between a signal level that represents one of the plurality of transmitted near end data symbols and a signal level that represents an emulation of said one of the plurality of transmitted near end data symbols;
   means for comparing the difference to an implied reference level without requiring a separate voltage input to receive the implied reference level; and means for adjusting the implied reference level to correct for one of a mismatch between the transmission and emulation means and a mismatch in the difference generation means.

18. The circuit of claim 17 further comprising:

means for timing the adjustment of the implied reference level, so that the adjustment occurs prior to the occurrence of a signal level change at an input of the comparison means, wherein the signal level change represents the transmission of one of the plurality of near end data symbol levels.

19. The circuit of claim 18 further comprising:

means for setting the implied reference level to represent approximately the midpoint between two adjacent, nominal data symbol levels defined for a transmission line signal.

20. The circuit of claim 19 wherein the adjustment means is to adjust the implied reference level by an amount approximately equal to the difference between the signal level that represents one of the plurality of transmitted near end data symbols and the signal level that represents the emulation of said one of the plurality of transmitted near end data symbols.

21. The circuit of claim 17 further comprising:

means for capturing and holding the signal level that represents one of the plurality of transmitted near end data symbols and the signal level that represents an emulation of said one of the plurality of transmitted near end data symbols.

* * * * *